(12) United States Patent
Kelly et al.

(10) Patent No.: US 7,874,824 B2
(45) Date of Patent: Jan. 25, 2011

(54) EQUIPMENT

(75) Inventors: Thomas Reid Kelly, Kettering (GB); Bryan Edwin Barwick, Higham Ferrers (GB); Vijay Arjun Sawant, Raunds (GB)

(73) Assignee: FMC Corporation, Philadelphia, PA (US)

( * ) Notice: Subject to any disclaimer, the term of this patent is extended or adjusted under 35 U.S.C. 154(b) by 147 days.

(21) Appl. No.: 12/315,008

(22) Filed: Nov. 26, 2008

(65) Prior Publication Data

US 2009/0078126 A1    Mar. 26, 2009

Related U.S. Application Data

(62) Division of application No. 10/488,329, filed as application No. PCT/GB02/03945 on Aug. 27, 2002, now abandoned.

(30) Foreign Application Priority Data

Aug. 30, 2001 (GB) .................. 0121037.6

(51) Int. Cl.
    *B29C 47/88* (2006.01)
(52) U.S. Cl. .................. 425/67; 425/69; 425/377
(58) Field of Classification Search .................. 425/67, 425/69, 311, 377
    See application file for complete search history.

(56) References Cited

U.S. PATENT DOCUMENTS

| 1,389,517 | A | * | 8/1921 | Kitsee .................. 264/103 |
| 2,403,547 | A |   | 7/1946 | Peschardt |
| 3,015,128 | A |   | 1/1962 | Somerville, Jr. |
| 3,682,654 | A |   | 8/1972 | Johnson |
| 3,922,360 | A |   | 11/1975 | Sneath |

4,117,172 A   9/1978  Bradshaw et al.

(Continued)

FOREIGN PATENT DOCUMENTS

FR    2749482    12/1997

(Continued)

OTHER PUBLICATIONS

USPTO Office Action dated May 27, 2008 in parent U.S. Appl. No. 10/488,329, filed Dec. 10, 2004.

(Continued)

*Primary Examiner*—Yogendra N Gupta
*Assistant Examiner*—Joseph Leyson

(57) ABSTRACT

Problems with incipiently gelling alginate or low-methoxy pectate sols in a bath of an aqueous solution containing calcium ions are reduced by having in the bath a perforated support surface which can be oscillated. The surface is preferably oscillated horizontally and vertically and preferably these oscillations are synchronised. Transport means to remove the product from the bath can be provided at one end of the bath. It is advantageous to ensure that at the beginning of the vertical oscillation the horizontal oscillation is in the direction of such transport means. Portions of the sol can be formed by extrusion either below or above the surface of the bath. The process is particularly useful for sols which have a sugar content greater than 10%. The invention also provides equipment comprising such a perforated support surface. Although the equipment is particularly useful for preparing alginate and low-methoxy pectate products it can also be used advantageously for other products which are formed in a bath and are susceptible to damage before they solidify adequately.

12 Claims, 2 Drawing Sheets

U.S. PATENT DOCUMENTS

| | | | |
|---|---|---|---|
| 4,119,739 A | 10/1978 | Barwick et al. | |
| 4,348,418 A | 9/1982 | Smith et al. | |
| 5,356,654 A | 10/1994 | White et al. | |
| 5,484,721 A | 1/1996 | Ors et al. | |
| 5,585,059 A * | 12/1996 | Kobayashi et al. | 264/186 |
| 5,783,241 A | 7/1998 | Bocabeille et al. | |
| 6,165,503 A | 12/2000 | Dettmar et al. | |
| 7,550,168 B2 * | 6/2009 | Kelly et al. | 426/515 |

FOREIGN PATENT DOCUMENTS

| | | |
|---|---|---|
| GB | 1302275 | 1/1973 |
| GB | 1369198 | 10/1974 |
| GB | 1507445 | 4/1978 |
| GB | 1564452 | 4/1980 |
| JP | 3277259 | 12/1991 |
| RU | 2063148 | 7/1996 |

OTHER PUBLICATIONS

USPTO Office Action dated Jul. 28, 2008 in parent U.S. Appl. No. 10/488,329, filed Dec. 10, 2004.

Xingwu et al., "Calcium alginate gels: formation and stability in the presence of an inert electrolyte," *Polymer*, vol. 39, No. 13, pp. 2759-2764 (1998).

* cited by examiner

EQUIPMENT

CROSS-REFERENCE TO RELATED APPLICATIONS

This application is a divisional of U.S. patent application Ser. No. 10/488,329, filed Dec. 10, 2004, now abandoned, which is an U.S. National Phase application under 35U.S.C. 371 of International Application Serial No. PCT/GB02/03945, filed Aug. 27, 2002, which claims priority to Great Britain Application No. GB0121037.6, filed Aug. 30, 2001, the entire contents of each of which are hereby incorporated by reference.

BACKGROUND OF THE INVENTION

Process and Equipment Processes for preparing simulated fruit have been described. An aqueous alginate or low-methoxy pectate sol incorporating dispersed fruit puree is treated with an aqueous solution containing dissolved calcium ions to allow the calcium ions to diffuse into the sol thereby gelling it. For instance, to prepare small simulated fruits, e.g. cherries or berry fruits, spherical portions of the sol containing dispersed fruit puree are contacted with the aqueous solution containing calcium ions. Such processes can also be used to prepare similar products not based on fruit.

In such methods of preparing alginate or low-methoxy pectate based products it is important to ensure that the products do not become distorted. This is normally achieved by adjusting the density of the aqueous solution containing calcium ions to ensure that the portions of alginate or low-methoxy pectate sol just float in the bath. This avoids distortion of the products by contact with the base of the bath or even from contact with the surface of the bath. But we have found that for high density products, e.g. high sugar products, adjusting the density of the bath containing calcium ions so that the portions of alginate or low-methoxy pectate sol just float leads to unacceptably slow gelation of the sol.

We have found that improved gelation can be achieved by using a perforated and oscillated support surface in the bath and with relatively low density aqueous solutions containing calcium ions. Our invention therefore provides a process in which portions of alginate or low-methoxy pectate sol are treated with an aqueous solution containing dissolved calcium ions in a bath so that the calcium ions diffuse into the sol thereby gelling it to form portions of alginate or low-methoxy pectate gel in which the aqueous solution containing dissolved calcium ions has a lower density than the density of the sol and the bath contains a perforated support surface plate to catch the descending incipiently-gelling portions of alginate or low-methoxy pectate sol which perforated support surface is oscillated.

Using our process the time for adequate surface setting of the portions of sol can be reduced from hours to a few minutes. Also our process enables achievement of tightly controlled residence times of the portions of alginate or low-methoxy pectate sol in the aqueous solution containing calcium ions.

Our process is particularly useful for preparing fruit-based products. For instance such products can advantageously contain high concentrations of sugar i.e. have high densities.

Our invention lies also in providing equipment suitable for use in the preparation of gelled alginate or low-methoxy pectate products which equipment comprises a bath which bath contains a perforated support surface for the products and oscillating means to oscillate the support surface. The equipment can also comprise an extrusion nozzle to deliver the product to the bath. Although the equipment is particularly useful for preparing alginate and low-methoxy pectate products it can also be used advantageously for other products which are formed in a bath and are susceptible to damage before they solidify adequately.

An especially preferred aspect of our invention is the use of a perforated and oscillated support surface when the alginate or low-methoxy pectate sol has a density at least 0.002 g/ml greater than that of the aqueous solution containing dissolved calcium ions. The process is particularly important for sols which have a density of at least 1.3 g/ml. For such sols it remains optimal for the density of the aqueous solution not to be greater than e.g. the density of a saturated aqueous solution of calcium lactate. It is unlikely that sols will be used which have densities higher than 1.5 g/ml but if they were, then there would still be no significant benefit in increasing the density of the aqueous solution containing dissolved calcium ions. References to densities are to densities at the relevant temperature in the process.

The support surface can be oscillated vertically or horizontally. Vertical oscillation is particularly significant and can work alone e.g. if the aqueous solution containing dissolved calcium ions flows over the support surface towards the transport means. But particularly preferably the support surface is oscillated both horizontally and vertically.

In a preferred form of the invention transport means are provided to remove product from the bath, preferably catching the products as they come off the support surface. The transport means are preferably at one end of the support surface.

In a particularly preferred form of the invention the vertical and horizontal oscillations of the support surface are synchronised. With such synchronised oscillation it is especially advantageous to ensure that, at the beginning of the upward movement of the vertical oscillation, the horizontal oscillation is in the direction of the transport means. The synchronised vertical and horizontal oscillations cause the support surface to move at an angle to the vertical. It is reasonably easy to achieve appropriate throughputs of the products by adjusting the angle and the frequency and length of the oscillations. In a specially preferred form of the invention the rear end of the support surface oscillates vertically over a shorter distance than the front end of the support surface. ("Rear" and "front" are in relation to the position of the transport means.) The movement of the front and rear ends of the support surface are preferably such that the front end reaches its lowest point just after the rear end reaches its lowest point. The support surface is preferably horizontal at its lowest point. It should be noted that a sloped but not oscillated support surface is ineffective.

The dimensions of the perforations in the support surface of course have to be such as to prevent the product falling through. The perforations are preferably such as to fluidise the incipiently gelling portions of alginate or low-methoxy pectate sol particularly when the support surface is oscillated vertically. Conveniently the perforations are circular.

We have also found that the perforated and oscillated support surface is preferably never less than 5 cms below the surface of the bath during the process i.e. even at its highest point when oscillated vertically. It should be noted that a very significant advantage of our invention is that our oscillated and perforated support surface can be as close to the surface of the bath as this or even closer. This is despite the products only being incipiently gelling. A normal surface would have to be more than 40 cms below the surface of the bath. In our process there is little point in having the support surface more than 30 cms below the surface of the bath as the greater the distance below the surface of the bath the larger the bath has to be with consequent larger quantities of bath liquor etc.

To minimise disadvantages of too long immersion, e.g. loss of solids from the product into the bath liquor and diffusion of water into the products, we prefer to have the support surface not more than 20 cms below the surface of the bath. Raising the bath temperature to above 30° C. e.g. 45° C. helps.

The portions of alginate or low-methoxy pectate sol are preferably formed by extrusion through a nozzle below the surface of the aqueous solution containing dissolved calcium ions. This is particularly so for products simulating larger fruits such as cherries. But the portions of alginate or low-methoxy pectate sol can be formed above the surface of the aqueous solution. With products the size of smaller fruits such as blackcurrants drops of the right size can be formed easily and dropped into the aqueous solution containing calcium ions. When the extrusion nozzle is below the surface of the aqueous solution it is advantageous for it to be not more than 5 cms below the surface of the bath. The support surface should be at least 5 cms below the extrusion nozzle.

Calcium lactate is our preferred source of calcium ions, particularly for food products, but other soluble calcium salts can be used e.g. calcium chloride, calcium acetate monohydrate, monocalcium phosphate monohydrate, monocalcium phosphate anhydrous and calcium gluconate.

Our process is especially useful in the preparation of simulated fruit. For this purpose the alginate or low-methoxy pectate sol can conveniently contain dispersed fruit puree. Our process is particularly advantageous when the sol has a relatively high sugar content. The sugar content is advantageously at least 10% and particularly preferably above 50%. A normal practical upper limit is 85%. We have also found that it is advantageous for fructose to be the predominant sugar i.e. forms more than 50% of the total sugars present. Preferably pure fructose is the only added sugar but, although not as preferred, the fructose can be in mixture with other sugars e.g. as in fructose syrups.

The products are preferably stored in a support matrix which has a balanced density to ensure the product is not deformed whilst it is firming up by diffusion of calcium ions into the core of the product.

Although our process can advantageously be used in the preparation of simulated fruit, it can be used to produce other products, especially but not only, other food products. For other products, vegetable puree or minced or pureed meat, for instance, can be used instead of fruit material.

Aqueous alginate sol is the preferred sol. When low-methoxy pectate is used it should preferably contain less than 30% methoxylated hydroxyl groups. "Low methoxy pectate" is a well-known term. The normal dividing line between low-methoxy pectate (or pectin) and high-methoxy pectate (or pectin) is 50% methoxylated hydroxyl groups. The alginate or low-methoxy pectate sol will usually be in the form of its sodium salt but potassium or ammonium salts can be used.

Our process can be used to produce products of a wide range of sizes and shapes. But conveniently the products are "spherical". They can have diameters for instance as low as 5 mm and as high as 30 mm. 25 mm is a preferred maximum diameter and 8 mm is a preferred minimum. The diameter of the nozzle and the time in the bath have to be altered appropriately for larger or smaller products. For instance 1 minute is ample for products, like simulated blueberries, with a diameter of 7 mm and 12 minutes can be necessary for products, like cherries, with a diameter of 25 mm. (Note that in comparison with earlier processes our process can achieve shorter residence times and very consistent residence times. It is particularly suited for continuous operation.)

Spherical portions of alginate and low-methoxy pectate sol can conveniently be formed by extruding the sol below the surface of the aqueous solution containing dissolved calcium ions through a nozzle of an appropriate diameter and separating the extruded sol to form approximately cylindrical portions with a length:diameter ratio of approximately 1:1. It is relatively simple to determine appropriate extrusion rates and cutting rates for a given size of nozzle.

In the extreme products of our process, and the portions of sol used in their preparation, can be perfectly spherical but they can vary from perfect spheres as do for instance spherical-shaped natural fruits. Indeed for instance deliberately elongated spheres e.g. grape-shaped products can be produced.

Suitable equipment constructed in accordance with the invention and a suitable process in accordance with the invention will now be described in greater detail, by way of example only, with reference to the accompanying Figures.

BRIEF DESCRIPTION OF THE DRAWINGS

REFERRING TO FIG. 1

Sodium alginate (Manugel DMB trade mark of ISP Alginates and obtainable from ISP (Alginates) UK) was slurried in glycerol by adding the alginate to the glycerol whilst gently stirring. The slurry was metered from tank T1 by pump P1 to a mixer M1. High-fructose syrup was metered from tank T2 by pump P2 also to mixer M1 which dispersed the alginate in the syrup. The syrup/alginate (see formulation) was passed down a coil C1 to a tank T4 where it was stored for at least 4 hours, typically overnight to allow complete hydration of the alginate. To ensure a supply of fully hydrated alginate sol it is sensible to have two tanks i.e. tanks T3 and T4 used alternately.

The syrup/alginate, an aqueous alginate sol with a high fructose content, produced the previous day and held in tank T4, was then pumped by pump P3 via a hopper H1 with an auger to mixer M2 (a dynamic in-line mixer e.g. a Mini Mondomixer available from Mondomix of the Netherlands).

A cherry mix was prepared from cherry puree and fructose with other minor ingredients (see formulation) and stored in tanks T5 and T6. The cherry mix was metered by pump P4 via a hopper H2 with an auger to mixer M2 to produce an aqueous alginate sol containing dispersed cherry pulp and with a high sugar content and to feed this to an extrusion head shown in FIG. 2.

Figure 2:
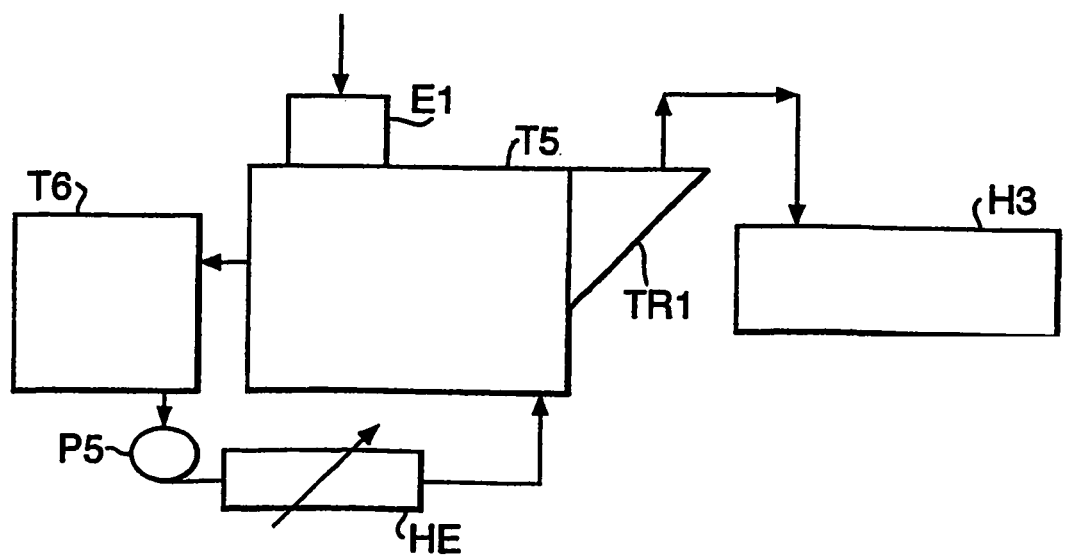
FIG. 2 is a flow-chart of the process and equipment from extrusion to packaging of the product.

Referring to FIG. 2

Figure 1:
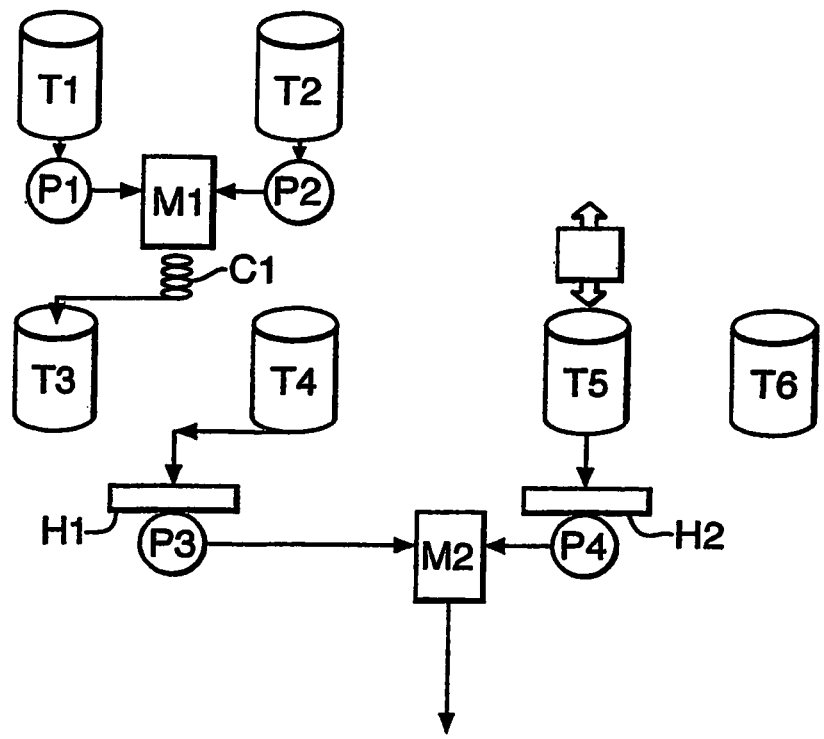
FIG. 1 is a flow-chart of the process and equipment prior to extrusion.

The aqueous alginate sol containing dispersed cherry pulp with a high fructose content prepared as described above with reference to FIG. 1 was fed to an extrusion head E1. Tank T5 contained a bath of an aqueous solution of 5% calcium lactate into which the aqueous alginate sol containing dispersed cherry pulp with a high sugar content was extruded. Cherry-sized products were formed as described below in connection with FIG. 3.

Transporter TR1 transported the products out of the solution of calcium lactate to final containers e.g. containers H3.

Before they reached container H3 excess lactate was blown off them. Container H3 contained a support matrix with a balanced density to ensure the product is not deformed whilst it is firming up by diffusion of calcium ions into the core of the product. The support matrix was pumped by pump P6 from hopper H4. The ratio of support matrix to product was about 1:4 when the container is adequately full.

The solution of calcium lactate was pumped by pump P5 from a make-up tank T6, then through a heat-exchanger to return to tank T5 from which it flowed over a weir to tank T6. A muslin bag kept replenished with calcium lactate was suspended in tank T6 to maintain the concentration of the calcium lactate. The density of the solution of calcium lactate was approximately 1.04 g/ml. The solution of calcium lactate was heated in heat exchanger (HE1) to maintain a temperature of 45° C. in tank T5. An advantage of our process is that there is little or no waste material to be removed from the system, after establishment of a balanced process, and it can be used continuously.

Figure 3:
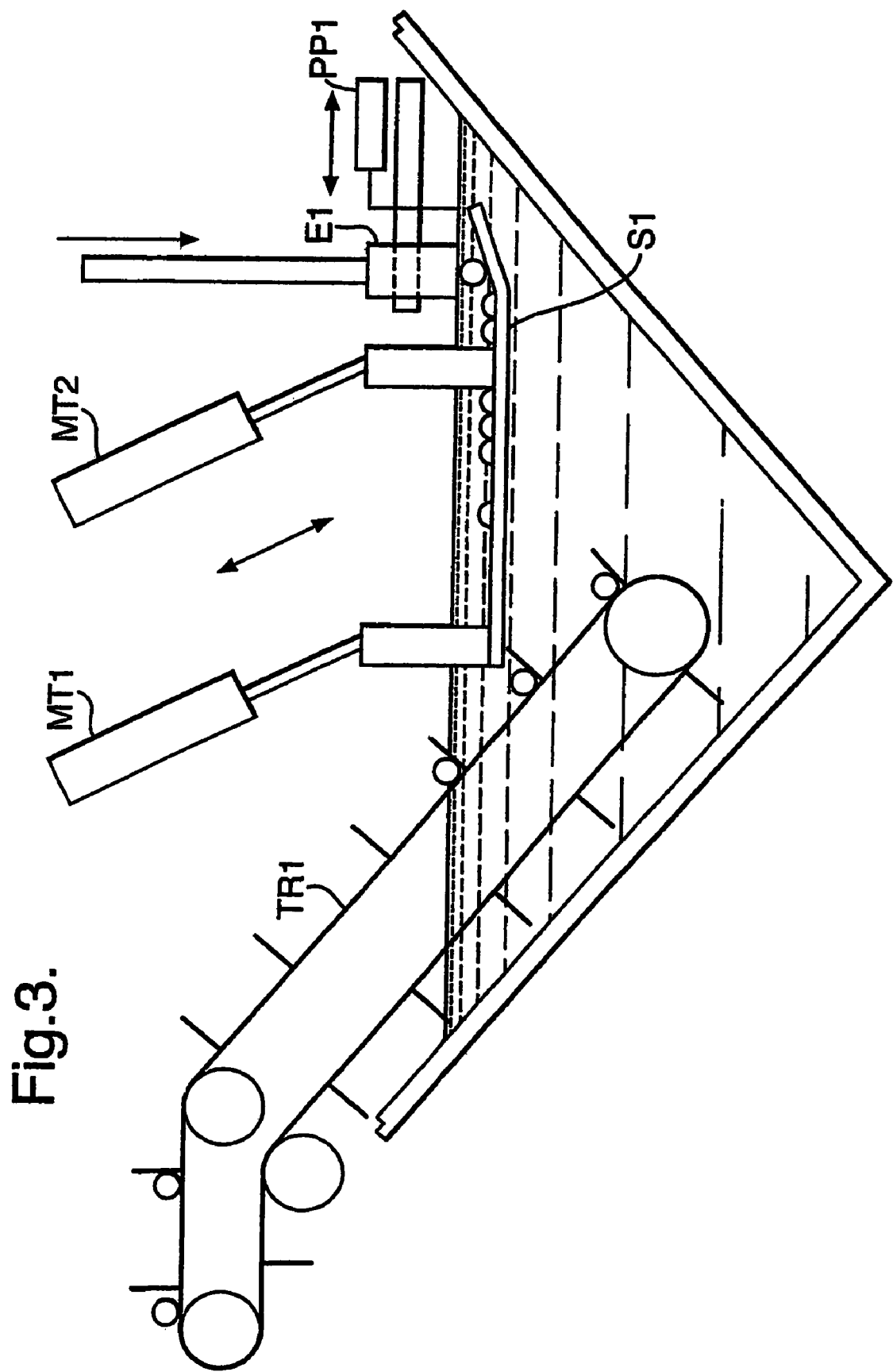
FIG. 3 is a cross-section showing the extrusion head, the bath, the support surface and the transport mechanism.

Referring to FIG. 3

Extrusion head E1 and the pneumatic piston PP1 are shown as are the oscillating and perforated support surface S1 and the transporter TR1 which conveyed the products. A wire (not shown) was oscillated across the mouth of E1 by pneumatic piston PP1. As the alginate sol was extruded through extrusion head E1 it was cut into cherry-sized pieces by a wire oscillating across the mouth of the extrusion head E1. The extrusion head E1 with an extrusion nozzle of diameter 1.5 cm was positioned 2 cms below the surface of the solution of calcium lactate. The aqueous alginate sol containing dispersed cherry pulp was extruded at 6 cms/sec. The wire was oscillated across the mouth of the nozzle to cut the extruded sol 4 times a second.

The cherry-sized pieces fell gently through the solution of calcium lactate on to an oscillating perforated support surface S1 attaining a cherry-like shape and were transported out of the solution of calcium lactate on a transporter TR1. Motors (i.e. pneumatic pistons) MT1 and MT2 caused the support surface S1 to oscillate horizontally and vertically, both at a frequency of 15 strokes a minute. The stroke length at the front of the support surface was 35 mm. The stroke length at the rear of the support surface was 27 mm. The angle from the vertical of the movement of the support surface was 20 degrees. The support surface at the highest point of its vertical oscillation was 4 cms below the extrusion head. The support surface immediately under the extrusion head was angled at 30 degrees to the horizontal. This was to avoid products piling up under the nozzle. The support surface had an array of circular perforations of 3 mm diameter spaced 6 mm apart. The support surface S1 had a low rim to prevent the cherry-sized pieces falling off other than on to the transporter TR1.

Details of the ingredients and mixtures used were as follows (percentages are by weight):

| % Syrup | |
|---|---|
| Fructose | 32.25 |
| Water | 13.74 |
| Colour | 00.01 |
| Total | 46.00 |
| Alginate slurry | |
| Sodium citrate | 00.20 |
| Sodium alginate | 00.80 |
| Glycerol | 3.00 |
| Total | 4.00 |
| Cherry mix | |
| Candied cherries | 25.00 |
| Citric acid | 1.20 |
| Sodium citrate | 0.40 |
| Fructose | 22.79 |
| Colour | 0.01 |
| Flavour | 0.60 |
| Total | 50.00 |
| Support matrix Fructose | 75.00 |
| Citric acid | 1.20 |
| Colour | 0.02 |
| Flavour | 0.04 |
| Water | 23.38 |
| Total | 100.00 |

The equipment and process described above is, of course, suitable for use with other compositions based on alginate or low-methoxy pectate sols.

What is claimed is:

1. A system suitable for use in preparing products which are formed in a bath and are susceptible to damage before the products solidify adequately, comprising a bath, a perforated support surface in the bath for the products, an oscillating assembly adapted and structured to oscillate the support surface, and a transport assembly provided at one end of the support surface and structured to remove the products from the bath, wherein the oscillating assembly is structured (i) to be able to oscillate the support surface vertically and horizontally and (ii) when each vertical oscillation begins horizontal oscillation is towards the transport assembly.

2. The system according to claim 1 further comprising an extrusion nozzle positioned to deliver the products to the bath.

3. The system according to claim 1 in which the oscillating assembly is structured such that the end of the support surface furthest from the transport assembly oscillates vertically over a shorter distance than the end of the support surface nearest the transport assembly.

4. The system according to claim 3 in which the oscillating assembly is structured such that vertical oscillation of the support surface is synchronized so that the end of the support surface nearest the transport assembly reaches its lowest point just after the end of the support surface furthest from the transport assembly reaches its lowest point.

5. The system according to claim 1 in which the oscillating assembly is structured such that the support surface is horizontal when lowest.

6. The system according to claim 2 in which the bath includes an input for a solution containing dissolved calcium ions and an outlet for the solution determining the level of the solution when the solution is in the bath.

7. The system according to claim 6 in which the oscillating assembly is structured such that the support surface is never less than 5 cms below the level of the solution when the solution is in the bath.

8. The system according to claim 6 in which the oscillating assembly is structured such that the support surface is never more than 30 cms below the level of the solution when the solution is in the bath.

9. The system according to claim 8 in which the oscillating assembly is structured such that the support surface is never more than 20 cms below the level of the solution when the solution is in the bath.

10. The system according to claim 6 in which the extrusion nozzle is below the level of the solution when the solution is in the bath.

11. The system according to claim 10 in which the extrusion nozzle is not more than 5cms below the level of the solution when the solution is in the bath.

12. The system according to claim 11 in which the oscillating assembly is structured such that the support surface is never less than 5 cms below the extrusion nozzle.

* * * * *